UNITED STATES PATENT OFFICE.

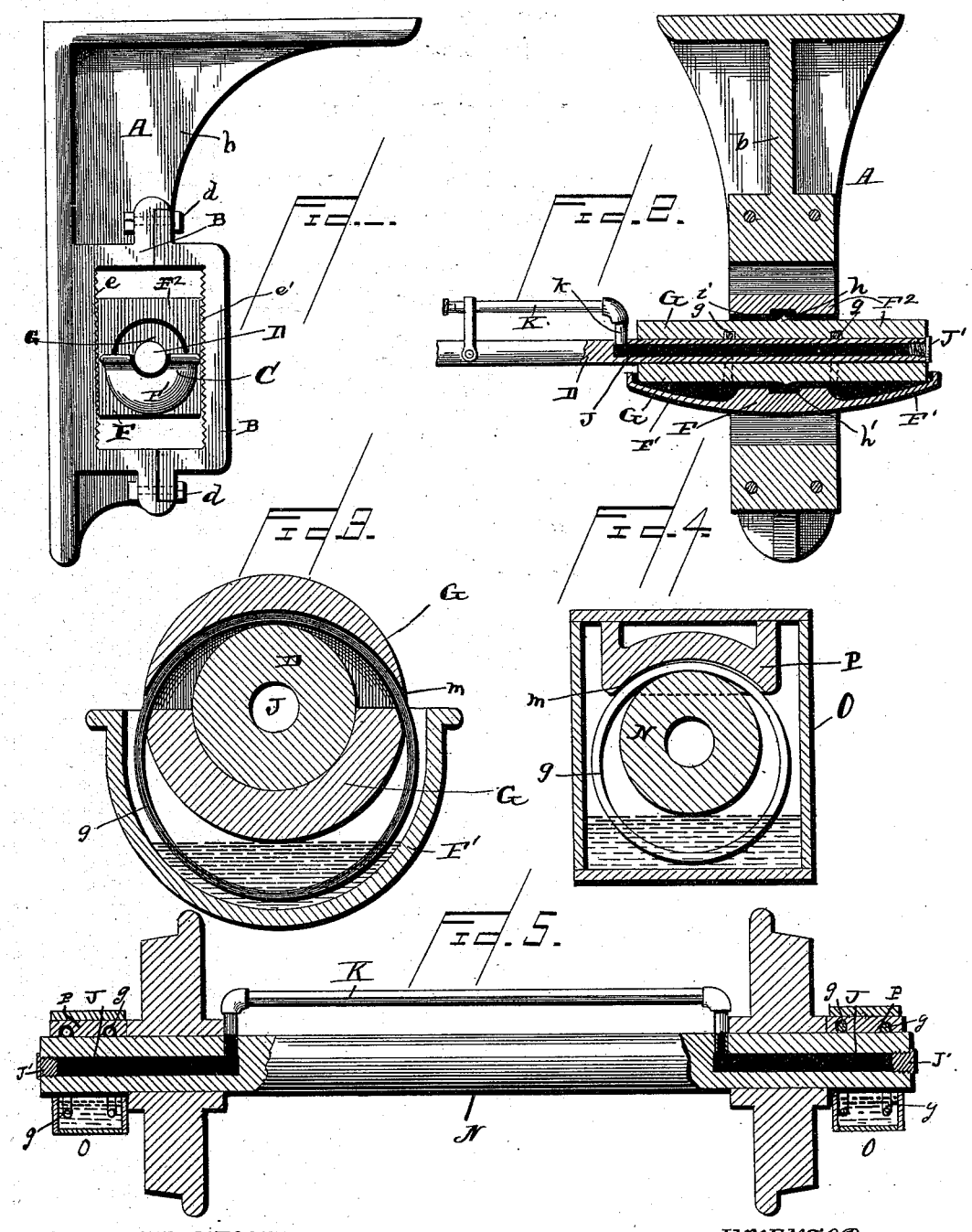

VIRGIL W. BLANCHARD, OF NEW YORK, N. Y., ASSIGNOR TO JOSEPH A. DAVIS, OF SAME PLACE.

LUBRICATOR AND COOLER FOR SHAFTS.

SPECIFICATION forming part of Letters Patent No. 413,925, dated October 29, 1889.

Application filed April 17, 1889. Serial No. 307,611. (No model.)

*To all whom it may concern:*

Be it known that I, VIRGIL W. BLANCHARD, of New York, in the county and State of New York, have invented certain new and useful Improvements in Lubricators and Coolers for Shafts; and I do hereby declare that the following is a full, clear, and exact description thereof, reference being had to the accompanying drawings, and to the letters of reference marked thereon, which form part of this specification, in which—

Figure 1 is a side view of my improved hanger and lubricator for shafts. Fig. 2 is a central vertical section taken partly through Fig. 1, showing the cooling and lubricating devices. Fig. 3 is a greatly-magnified cross-section through a shaft, its journal-box, and my oil-lubricating device. Fig. 4 is a modification which shows my improved mode of lubricating and cooling a line-shaft applied to a car-axle box. Fig. 5 is a central sectional view of a car axle and wheels having my cooling and lubricating devices applied.

The invention which I am about to describe is especially designed for centering and properly aligning a shaft or journal, and also for automatically lubricating and cooling the same; and it consists in certain novel devices for the accomplishment of said objects, which will be hereinafter fully explained.

The bracket or hanger proper is lettered A in the annexed drawings. It consists, preferably, of a rectangular portion, which is adapted to be secured either to a horizontal overhead beam or to a vertical beam or wall, and its webs may be slotted for the purpose of receiving bolts and allowing it to be adjusted to suit the requirements of the case. This bracket A is also constructed with a central rib $b$, for the purpose of affording great strength combined with lightness; and it is furthermore constructed with a half-box B, and by means of bolts $d\ d$ the two halves of the box are rigidly secured together.

D designates a shaft, which is journaled in a bearing composed of two semi-cylindrical pieces G G, constructed with reversible knife-edge bearings $h\ h'$. These knife-edges are V-shaped projections arranged diametrically opposite each other, the lower one having its bearings in a notch made in the lower half F of a block C, and the upper one entering a recess $i$ in the upper half $F^2$ of said block, as shown in Fig. 2. The blocks have serrations $e'$, which are adapted to match the serrations $e\ e$ in the half-boxes B. By these means the block C is rigidly held in place, and by loosening the bolts $d$ the block can be adjusted higher or lower for properly aligning the shaft D. The lower half F of the block C is constructed with cup-shaped extensions F' F', which are adapted for containing a lubricating-fluid to be supplied to the shaft D. This supply is effected by means of rings $g\ g$, which are free to revolve through a passage $m$ made in the journal-bearing by slotting the halves thereof at the proper point, as indicated in Figs. 3 and 4, and which are of such diameter that they dip deeply into the oil-receptacles F' F', and during the rotation of the shaft D convey oil from these receptacles to this shaft. The surplus oil flows from the shaft back into the receptacles.

It will be seen that block C affords a support for the journal-bearing, and that the lower block forms receptacles for oil, which is fed to the shaft D by the revolution of the rings $g\ g$; also that when the lower knife-edge, used for balancing the journal-box, is worn dull the box can be reversed and the upper knife-edges used as the bearings.

In order to cool the shaft D and prevent heating thereof and of the journal-box, I centrally bore the journal end of the said shaft, as indicated at J, the bore extending the length of the box and being closed at the end of the shaft by a plug J'. At the other side of the journal the bore communicates by lateral opening with a short branch pipe $k$, which is connected to a joint of piping K, lying parallel with the shaft and supported thereon at its extremity and having its outer end closed; or, if the shaft is short, the pipe might communicate with a bore similar to J in the other end of the shaft.

The pipe K, it is obvious, will rotate with shaft D and be fanned by the surrounding air, so that it will be kept cool thereby, and I fill the pipe before closing its end, and also the bores J, with a non-freezing heat conducting or diffusing fluid, such as alcohol or aqua-ammonia. Now, as the diffusion of heat or cold or equality of temperature in liquids and gases is an established fact, it is obvious that if the fluid in joint K be cooled the fluid in bore J will be reduced correspondingly in temperature. Naturally, however, when the shaft is rotated the journal would become heated by friction, although the friction is reduced to the minimum by the lubricating devices. This heat, however, is directly transmitted to the fluid in bore J and from thence to that in joint K, and as the latter revolves with the shaft and is kept in rapid motion through the air the joint and fluid therein are cooled and the heat engendered at the journal radiated or transmitted to the air contacting with the joint K, and therefore, as is obvious, I keep the journal at a normal cool temperature.

I have represented by Figs. 4 and 5 of the drawings my self oiling and cooling device applied to a car-axle box for lubricating the axle-journal therein. In this the car-axle N is bored at its ends and the bores connected between the wheels by piping K, as shown. The axle-boxes O contain the oil and are suspended on the axle-journals, half-boxes or bearings P being placed on top of the journals and the lubricating-rings g running through passages in the blocks, as shown. The ring or rings g in this box will revolve through a passage made in the top bearing and the surplus oil will flow from the axle-journal back into the chamber below it, while the fluid in the bores at the ends of the axle and the joints of pipe connecting said bores will effectually cool the journals and prevent the annoying "hot boxes," which occur frequently at present, and are both a source of danger and expense to the railroads.

Having described my invention, what I claim as new, and desire to secure by Letters Patent, is—

1. A hanger for shafts, provided with half-boxes, in combination with adjustable blocks, a continuous ring, and a balanced journal-box, substantially as described.

2. The combination of the shaft having a closed bore in its journal and pipe rotating with and exterior to said shaft and communicating with said bore, said bore and pipe being provided with heat-diffusing fluid for cooling the journal, substantially as specified.

3. The combination of the block C, having oil-receptacles, a journal-box balanced by a knife-edge on said block, and oil-feed rings for the shaft, substantially as described.

4. The combination of the shaft having a closed bore in its journal and a pipe communicating with said bore and rotating with said shaft with the slotted journal-box, the block having an oil-receptacle, and the lubricating-ring suspended on said shaft and passing through the slot in the journal-box, substantially as and for the purpose specified.

5. The combination of the hanger A, the serrated blocks having the oil-receptacles therein, the balanced journal-box, and the lubricating-ring, substantially as described.

6. In a hanger for shafts, the combination of the serrated half-boxes, the blocks vertically adjustable in the same and provided with recesses or notches, and the reversible journal-box having knife-edges, substantially as described.

7. The combination of the block having oil-receptacles, a journal-box balanced therein by a knife-edge, and oil-feed rings for the shaft with the shaft having a closed bore through its journal, and a pipe rotating with said shaft and communicating with said bore and adapted to receive heat-diffusing fluid therein, substantially as described.

In testimony that I claim the foregoing as my own I affix my signature in presence of two witnesses.

VIRGIL W. BLANCHARD.

Witnesses:
ALEX. S. STEUART,
A. E. DOWELL.